United States Patent [19]

Ambrosio et al.

[11] Patent Number: 4,713,803
[45] Date of Patent: Dec. 15, 1987

[54] BIDIRECTIONAL DIGITAL TRANSMISSION SYSTEM WITH ECHO-CANCELLATION

[75] Inventors: Renato Ambrosio, S. Raffaele Cimena; Alberto Brosio, Borgaro Torinese; Alfredo Fausone, Ivrea; Adler Tofanelli, Collegno, all of Italy

[73] Assignee: SIP—Societa Italiana per l'Esercizio Telefonico p.a., Turin, Italy

[21] Appl. No.: 861,073

[22] Filed: May 8, 1986

[30] Foreign Application Priority Data

May 14, 1985 [IT] Italy .............................. 67441 A/85

[51] Int. Cl.$^4$ ............................................. H04L 5/14
[52] U.S. Cl. ................................... 370/32.1; 379/406
[58] Field of Search ................. 370/24, 27, 32, 32.1; 379/406, 407, 409, 410, 411; 375/13, 14

[56] References Cited

U.S. PATENT DOCUMENTS 4,484,322 11/1984 Fossati et al. ..................... 370/32.1
4,531,220 7/1985 Brie et al. ............................ 370/32

OTHER PUBLICATIONS

Vry et al—"The Design of a 1+1 System"—NTG Fachber (Germany) vol. 73, 1980, pp. 36–40.

Primary Examiner—Joseph A. Orsino, Jr.
Attorney, Agent, or Firm—Karl F. Ross; Herbert Dubno

[57] ABSTRACT

A bidirectional digital transmission system with echo-cancellation allows the measurement of the received data signal and the automatic adaptation of the attenuator and of the line equalizer. They are implemented by using circuits already present in a conventional system, in addition to auxiliary circuits.

5 Claims, 1 Drawing Figure

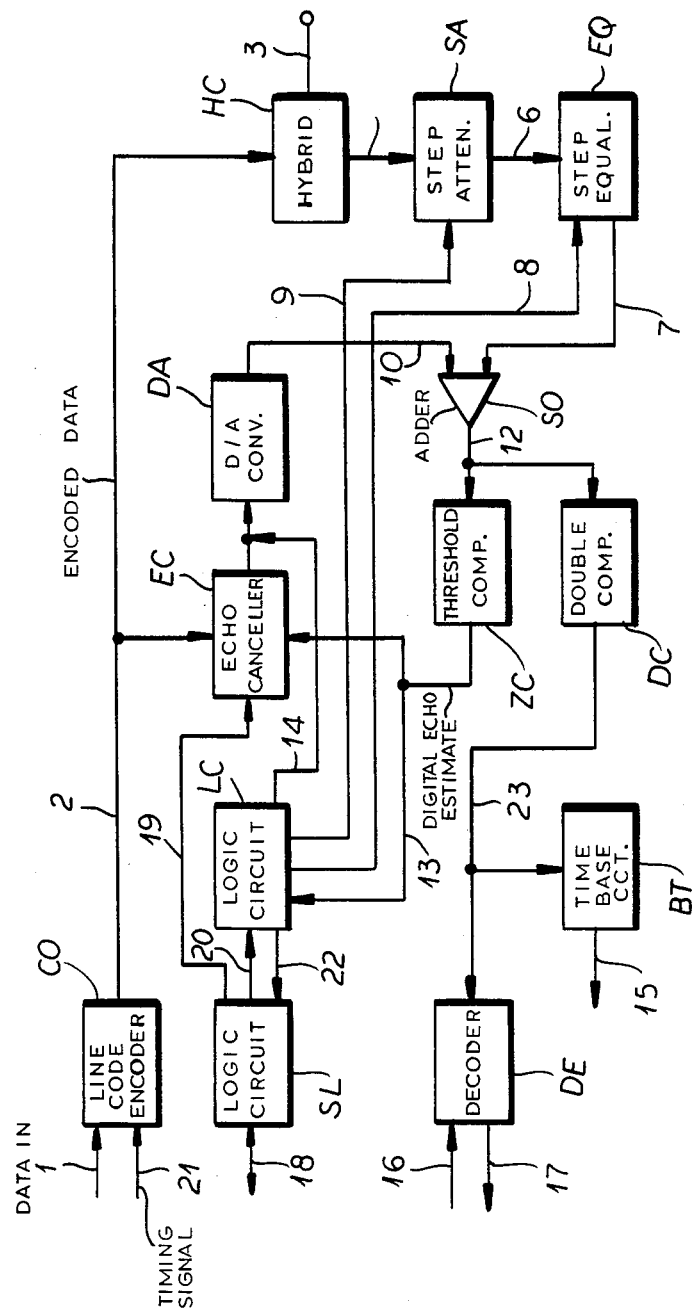

BIDIRECTIONAL DIGITAL TRANSMISSION SYSTEM WITH ECHO-CANCELLATION

FIELD OF THE INVENTION

The present invention relates to transmission of digital data and, speech signals on a subscriber line and more particularly, to improvements in a system for bidirectional digital transmission with echo cancellation.

BACKGROUND OF THE INVENTION

It is known that most high-speed digital-transmission systems (e.g. 144 kbit/s systems), designed to operate with subscriber's lines in the national or private networks, require an equalizer for the received signal.

In fact, the transmission line introduces attenuations of various values depending on the frequency of the transmitted signal, thereby distorting the transmission.

In addition the receiver must afford the possibility of adjusting the gain, since the transmission lines may have different lengths dependent on the subscriber's distance from the exchange, and hence the introduced attenuations are different and cannot be predetermined.

A continuous or step manual adjustment requires the intervention of an operator upon installation, and, owing to possible variations in the line characteristics with time, during the operation. The high cost of such interventions and the necessity of maintaining the best system performances over time render the use of automatic gain controls particularly advantageous for an automatic receiver adaptation to the amplitude of the received data signal.

In order to automatically carry out such automatic operations the amplitude has to be precisely estimated.

According to known techniques, such estimates are made by measuring the dc voltage obtained from the signal which is subjected to a non-linear operation, usually a detection of the envelope obtained by rectifying, possibly followed by a low-pass filtering operation. However, these operations have a number of disadvantages, due both to low sensitivity of non-linear components in handling very weak signals, and to the dispersion of the characteristics of the components themselves. In fact, non-linear components with strictly equal parameters, i.e. such as to ensure a good reproducibility in the accuracy and sensitivity properties of the detector, cannot be achieved by present integrating techniques.

There is also the difficulty of reproducing a precise reference voltage with which the voltage to be measured may be compared.

SUMMARY OF THE INVENTION

These drawbacks above are overcome by the improvements to the systems for bidirectional digital transmission with echo-cancellation, provided by the present invention, which allow a high accuracy of the automatic gain control in the system receiver, without the problems of reproducibility and sensitivity heretofore encountered.

The invention has proved to be of particular interest in transmission systems based on echo-cancelling techniques, since for the invention components already present in the systems using these techniques. These components include the digital-to-analog converter, the threshold comparator and other circuits, which, being dimensioned as a function of the system, have a sensitivity and dynamic range which is compatible with the signal to be processed and with the accuracy required.

The present invention provides a system for bidirectional digital transmission with echo-cancellation, which comprises:
- an encoder to encode in line code a data signal at its input;
- a hybrid to transfer to the line the data signal supplied by the encoder and to transfer from the line the data signal received;
- a remotely-controllable attenuator;
- a remotely-controllable equalizer;
- an echo canceller to supply an estimated-echo signal, correlated with the encoded data signal and with a digital signal supplied by a threshold comparator;
- an adder to sum the received data signal, supplied by the attenuator and equalizer, with the estimated echo signal supplied by a digital-to-analog converter;
- the aforementioned threshold comparator to detect zero crossings of the signal supplied by said adder;
- a double threshold comparator to detect positive and negative threshold crossings of the signal supplied by the adder;
- a decoder to decode the signal supplied by the double threshold comparator and to supply at the output the data signal received;
- a time base circuit.

According to the invention, the system also includes:
a first logic circuit, which, on the basis of the information on the link time phase received at the input, alternately enables either the echo canceller or a second logic circuit so that the digital-to-analog converter receives respectively either the estimated echo-signal or, during an initial phase of the link, a suitable digital sequence, which, converted into analog form, is added in said adder to the received data signal and zero crossings are detected by said threshold comparator; and the aforementioned second logic circuit, which receives at the input the information on zero crossings supplied by the threshold comparator and, at a suitable instant, generates control signals for the attenuator and for the equalizer in order to control the transmission system gain, the control signals being correlated to the amplitude of the received data signal. The second logic circuit also generates and sends a signal of occurred gain adjustment to said first logic circuit, which re-enables the echo-canceller, inhibits the second logic circuit and communicates the availability of the system to transmission operations.

According to the invention the suitable sequence is a digital sequence with successive increments or decrements of value equal to half the preceding one, the suitable instant being determined by the end of a predetermined number of additions carried out in the adder. The digital value representative of the amplitude of the received data signal used by the threshold comparator consists of the succession of zero crossings supplied by said threshold comparator.

BRIEF DESCRIPTION OF THE DRAWING

These and other features of the present invention will be apparent from the following description of a preferred embodiment thereof, given by way of example and not in a limiting sense, with reference to the annexed drawing the sole FIGURE of which is a block diagram of a system for bidirectional digital transmission on a two-wire line with echo-cancellation and automatic gain control.

SPECIFIC DESCRIPTION

The continuous data flow to be sent to transmission line 3 arrives on wire 1 and the corresponding timing signal on wire 21. They access a circuit CO, where they are duly encoded in the desired line code.

The encoded data, present on wire 2, are simultaneously sent to hybrid HC and to echo-canceller EC.

The signal to be transmitted is sent through the hybrid partly on the two-wire line 3, partly on a balance load and, due to unavoidable imbalance and reflections along the line, onto wire 4 connected to the input of receiving end.

Also the useful signal, arriving from the remote transmitter, is present on wire 4. This signal accesses a step attenuator SA, controlled by the signal on wire 9, and hence, through wire 6, step equalizer EQ, controlled by the signal on wire 8.

The signal equalized by EQ is sent through wire 7 to an adder SO, by which it is added to the estimated echo-signal supplied on wire 10 by a digital-to-analog converter DA, in order to cancel the interference produced by the local transmitter on the useful signal.

A threshold comparator ZC detects zero crossings of the signal present on wire 12, connected to the output of the adder SO, supplying at the output on wire 13 a digital flow for the estimate of signal signal. A double comparator DC is also connected to wire 12.

The double comparator DC compares the received signal, with a positive and negative threshold which usually has three levels, and supplies at the output on wire 23 a digital flow wherefrom a decoding circuit DE recovers the transmitted data signal.

This signal is made available at the output on wire 17, with the phase determined by the clock being present on wire 16.

Echo canceller EC processes the signal on wire 13 and the signal to be transmitted on wire 2 according to a suitable algorithm, and supplies digital estimated-echo signal on wire 14 to the already-described converter DA.

The timing signals for the main system blocks are generated by a time-base circuit BT and are made available at the output on wire 15. It extracts the synchronism information from the signal present on wire 23 at the output of comparator DC.

Let us see now how the just-described conventional transmission system is modified according to the invention.

It is worth noting that the adjustments of step attenuator SA and equalizer EQ are effected only in the initial transmission phase, since the transmission line parameters are intended to have negligible temperature-induced variations during transmission.

In the transmission systems with echo-cancellation technique, the starting procedures usually provide a training phase during which the initial canceller updating is effected. Since during this phase no operative signal is present on the line, a time interval can be dedicated to the amplitude measurement of the received signal.

This initial phase is detected and controlled by a logic circuit SL, which receives on connection 18 the information on the channel activity state and enables echo-canceller EC, through wire 19, to updating operations.

Besides, in a suitable time interval of the initial phase it starts the procedure for the measurement of the maximum amplitude of the received signal, using known methods in the domain of circuits for analog-to-digital conversion.

To do that, logic circuit SL controls through wire 20 the logic circuit LC which contains a sequential circuit adapted to emit an increasing digital sequence on wire 14. By driving the input of converter DA by such a sequence, at the analog output connected with wire 10 a voltage ramp is obtained with an accuracy equal to $\pm \frac{1}{2}$ LSB (LSB=least significant bit). This voltage ramp is added by adder SO to the signal received from the remote terminal, no interference being generated by the local transmitter, inactive in this initial phase. As long as the voltage ramp has a value less than the amplitude of the received signal, which has a null dc component, the signal at the output of adder SO assumes both positive and negative values and comparator ZC detects the respective zero crossings. When the ramp amplitude equals and then exceeds the received signal amplitude, transitions stop. A transition detector, contained in circuit LC, receives the signal supplied on wire 13 by comparator ZC and when the transitions stop reads the digital value attained by the ramp, with an accuracy of $\pm \frac{1}{2}$ LSB.

A correspondence matrix contained in the logic circuit LC supplies over wires 8 and 9 the suitable commands for attenuator SA and equalizer EQ, on the basis of the digital value obtained from the measurement of the amplitude of the received signal. These circuits are, as a consequence, adjusted to the signal level and to the line conditions for the link duration.

Another already-known method, used in the domain of analog-to-digital converters, can be employed which is not based on the use of linearly-increasing digital sequences, and hence on comparisons of the received signal with voltage ramps, but on the use of digital values with halved increment after each addition (dichotomic method).

In this case logic circuit LC supplies a predetermined number of digital values with positive or negative increments dependent on whether zero crossings at the output of comparator ZC have been found or not.

A binary digit relative to received signal amplitude is obtained at each comparison, and, hence, adjustments of attenuator SA and equalizer EQ can be carried out through the correspondence matrix. After these operations the initial phase ends and the usual bidirectional transmission can begin.

Logic circuit LC communicates occurred gain adjustment to circuit SL through wire 22, the echo-canceller is enabled again after having been cut off at the logic conclusion of a prior transmission through wire 19 and the external transmission devices are informed that the system is ready to transmit through connection 18.

We claim:

1. A system for bidirectional digital transmission with echo cancellation, comprising:
    an encoder for encoding in line code a data signal received at an input of said encoder;
    a hybrid connected to an output of said encoder for supplying to a line a data signal encoded by said encoder and for receiving from said line a data signal transmitted thereover;
    a remotely-controllable attenuator connected to said hybrid;

a remotely-controllable equalizer connected to said attenuator;

an echo canceller connected to said output of said encoder for supplying an estimated-echo signal correlated with said encoded data signal;

a first threshold comparator connected to supply a digital signal to said echo canceller with which said estimated-echo signal is also correlated;

an adder having a first input connected to an output of said equalizer and an output connected to said first threshold comparator for summing a data signal received from said line by said hybrid and processed through said attenuator and said equalizer with said estimated-echo signal and applying to said first threshold comparator a signal outputted by said adder and whose zero crossings are detected by said first comparator to generate said digital signal;

a digital-to-analog converter connected to an output of said echo canceller for receiving said estimated-echo signal, said digital-to-analog converter being connected to a second input of said adder for applying said estimated-echo signal thereto;

a second, double-threshold comparator connected to said output of said adder for detecting positive and negative threshold crossings of the signal outputted by said adder;

a decoder connected to an output of said second comparator for decoding a signal outputted thereby and for delivering at an output of said decoder the data signal received from said line;

a time base circuit connected to said output of said second comparator for extracting synchronism information from the signal outputted by said second comparator;

a first logic circuit having an input receiving link time phase information, a first output connected to said echo canceller, and a second output; and a second logic circuit connected to said second output of said first logic circuit and connected in turn to said digital-to-analog converter, said first logic circuit being connected and arranged to alternately enable said echo canceller and said second logic circuit so that said digital-to-analog converter receives respectively said estimated-echo signal during a transmission and at an initial phase of establishment of a transmission link, a digital sequence which, converted into analog form by the digital-to-analog converter can be added in said adder to the data signal received from said line and resulting zero crossings are detected by said first comparator, said second logic circuit being connected and arranged to receive information on zero crossings during said initial phase to generate respective control signals for said attenuator and said equalizer and applying said control signals to said attenuators and said equalizer for controlling transmission gain, said control signals being correlated with the amplitude of the data signal received from said line, said second logic circuit being further connected to said first logic circuit to send thereto a signal representing effected gain adjustment, and said first logic circuit is further connected and arranged upon receipt of said signal representing effected gain adjustment to re-enable said echo canceller after it has been disabled following a prior transmission, to inhibit said second logic circuit for a succeeding transmission and to communicate a signal representing availability of the system for the succeeding transmission.

2. The system defined in claim 1 wherein said sequence is a linearly increasing digital sequence from which a voltage ramp is obtained at an output of said digital-to-analog converter, an end of the zero crossings detected by said first comparator determining the instant at which there is present at an output of said second logic circuit a digital value representative of the amplitude of the data signal received from said line and the time at which said control signals are applied to said attenuator and said equalizer.

3. The system defined in claim 1 wherein the correlation between said control signals and the amplitude of the data signal received from said line is obtained with a correspondence matrix in said second logic circuit.

4. The system defined in claim 1 wherein said sequence is a digital sequence with successive values being equal to half a preceding value, the control signals being applied to said attenuator and said equalizer at an instant determined by the end of a predetermined number of additions carried out in said adder, a digital value representing the amplitude of the data signal received from said line consisting of a succession of zero crossings supplied by said first comparator.

5. The system defined in claim 4 wherein said second logic circuit emits successive signals differing in value from the value of a preceding signal according to the type of zero crossings supplied by said first threshold comparator.

* * * * *